April 21, 1959 — W. B. DEAN — 2,882,703
SHAFT DRIVE ASSEMBLY
Filed Feb. 15, 1957 — 2 Sheets-Sheet 1

INVENTOR
Walter B. Dean
BY Wm. R. Glisson
ATTORNEY

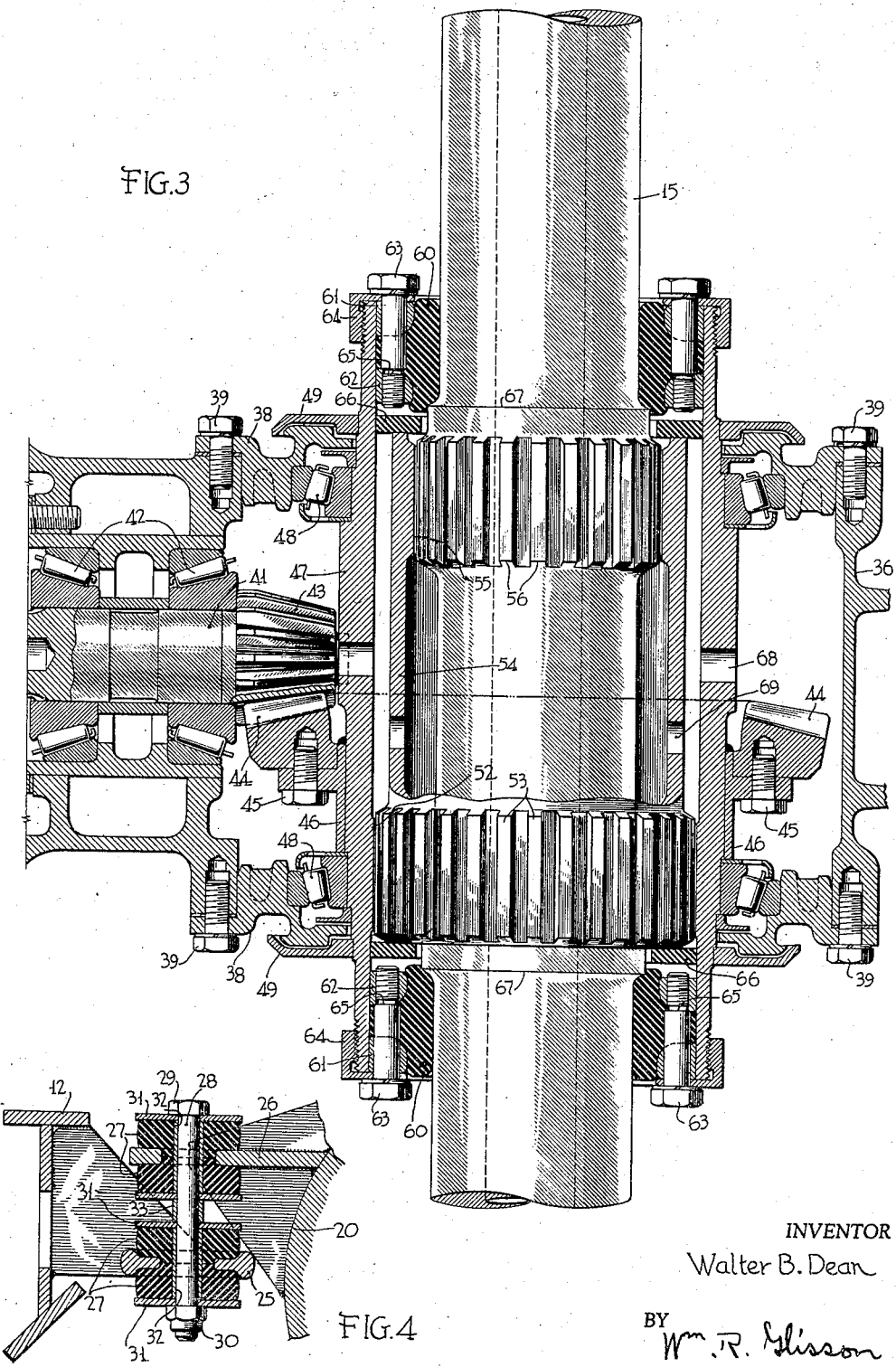

United States Patent Office 2,882,703
Patented Apr. 21, 1959

2,882,703
SHAFT DRIVE ASSEMBLY

Walter B. Dean, Narberth, Pa., assignor to The Budd Company, Philadelphia, Pa., a corporation of Pennsylvania Application February 15, 1957, Serial No. 640,539

4 Claims. (Cl. 64—1)

This invention relates to a shaft drive assembly, especially for driving vehicle axles, and has for an object the provision of improvements in this art.

One of the particular objects of the invention is to provide a motor mount and drive for a wheel supported axle which will allow the most complete freedom of movement of the motor casing between the supporting frame and axle.

Another object is to provide a motor mount and axle drive which will minimize the transmission of road shock from the axle to the motor.

Another object is to provide a resilient drive and packing or sealing joint in which the rubber is effectively squeezed to the correct shape and pressure with limit stops to avoid excess pressure and injury to the rubber.

Another object is to provide a shaft drive assembly which allows ample angular movement between the shaft and motor casing.

The above and other objects and various features of novelty will be apparent from the following description of an exemplary embodiment of the invention, reference being made to the accompanying drawings thereof, wherein:

Fig. 3 is a further enlarged horizontal section taken on the line 3—3 of Fig. 2; and Fig. 4 is an enlarged vertical section of a detail taken on the line 4—4 of Fig. 1.

Figure 1:
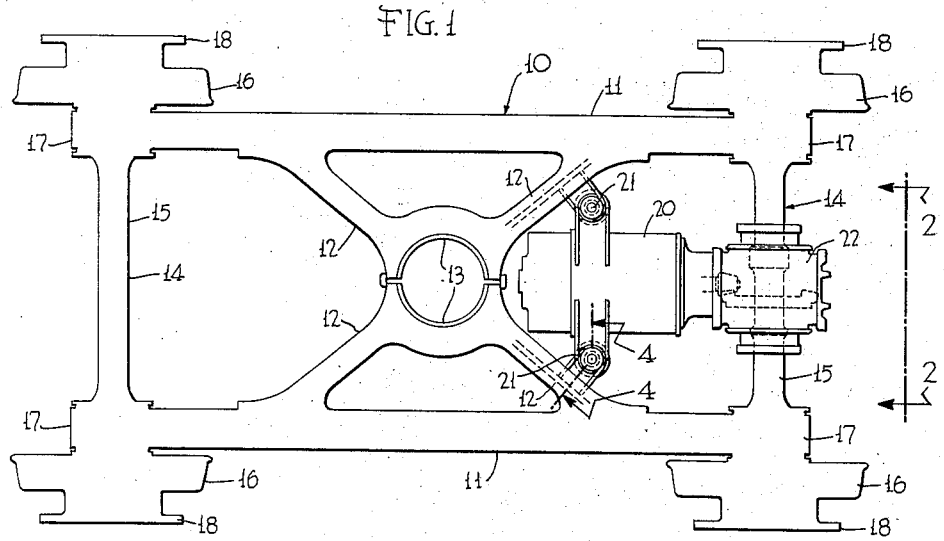
Fig. 1 is a top plan view of a rail vehicle truck on which apparatus embodying the invention is applied.
Figure 2:
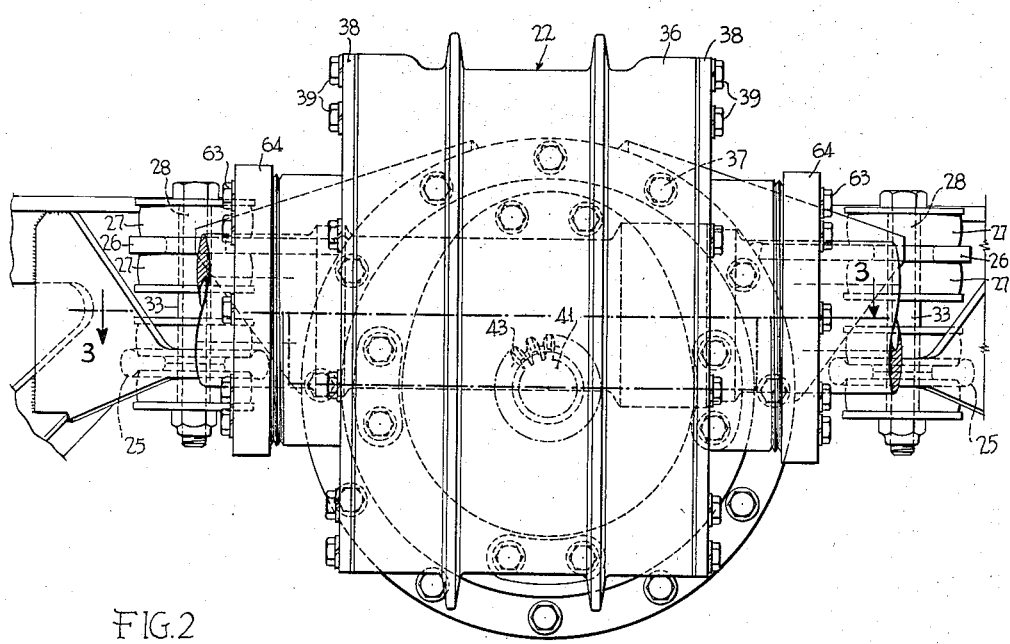
Fig. 2 is a central enlarged end elevation taken on the line 2—2 of Fig. 1.

As shown in Fig. 1, a truck 10 comprises side frames 11 having inwardly extending V-shaped portions 12 which are provided with semi-cylindrical recesses 13 to embrace a bolster center pin structure, not shown.

At each end the side frames are supported and held together for all necessary weaving motion by wheel-axle units 14, each comprising an axle 15, two wheels 16 fast thereon and spherical resilient bearing assemblies 17 with the ends of the frame. Brake disks 18 are carried outside the wheels.

One of the shafts or axles 15 is driven by a motor 20 supported at two joints 21 on the frames and at a single point in a gear drive unit 22 on the axle. The mounting is such as to permit all necessary weave between the axle and truck side frames without imposing undue loads on the motor casing.

As shown, in Fig. 4, the two inner joints 21 each comprises overlapping but vertically spaced brackets 25 and 26 on the frame and motor casing respectively, resilient elastic doughnuts 27, as of rubber, and an anchor bolt 28 having a head 29 and nut 30 for bringing pressure on the doughnuts. Washers 31 and sleeves 32 together with a sleeve spacer 33 provide that the proper pressure will be applied to the doughnuts.

The joint is not only very flexible but is also safe because of the fact that the motor brackets are disposed above the frame brackets and the motor cannot fall out even if the bolt connections should be lost.

The gear drive unit 22 is an improved form of what is commonly known as a "Spicer drive." It comprises a fixed casing 36 which is secured to the casing of motor 20, as by flanges held by cap screws 37, and end plates 38 which are secured to the casing 36, as by cap screws 39.

The motor has a shaft 41 turning in bearings 42 and carrying on its end a bevel pinion 43 which meshes with and drives a bevel ring gear 44 which is secured, as by cap screws 45 to a sleeve 46. The sleeve 46 is secured, as by brazing or welding, or both, to an outer drive sleeve 47 which is rotatable on roller bearings 48 in the casing end plates 38. Cap rings 49 are pressed on the drive sleeve 47 after assembly.

The outer drive sleeve 47 is provided near one end interiorly with splines 52 which interengage the exterior splines 53 formed on one end of an inner drive sleeve 54 which at that end loosely surrounds the axle 15 leaving space therebetween. At its other end the inner drive sleeve 54 has splines 55 formed on its inner surface to interengage splines 56 formed on or secured to the axle 15.

By this arrangement the axle is driven through the inner drive sleeve and can have the necessary angular movement or gyration caused by track unevenness and blows without transmitting shocks to the motor casing. To assist this action the splines are opened slightly near their ends and are made slightly arcuate about radii to the axle axis as a center. The dimensions are too small to show in the drawings but the freedom of action through the inner drive sleeve can be readily understood.

The spaces between the interior of the outer drive sleeve 47 at its ends and the axle 15 are tightly filled and sealed by resilient, elastic oil-resistant material, such as rubber bushings 60. These bushings are squeezed between rings 61 and 62 by tightening cap screws 63 carried by cap rings 64 which are screwed on the ends of the outer drive sleeve 47.

The rings 61 and 62 are curved interiorly to force rubber tightly against the axle as it is squeezed between the rings. These curved surfaces also avoid incipient rupture points in the rubber which would exist if sharp edges were present. Preferably the rings have the rubber vulcanized to them and thereafter are split on a diameter for easy insertion and removal. Shoulders 65 are provided near the inner ends of the cap screws 63 to stop against the side of the inner ring 62 to limit the pressure on the rubber to just the amount which it is designed to take.

It will be seen that the tight rubber bushings very effectively take all shocks from the axle toward the shaft and that no shocks except rotational can be transmitted through the quill drive sleeve. Yet a solid drive connection between the axle and motor shaft is maintained at all times due to the floating sleeve and its splined connections. The inner supports co-operate with the drive support of the motor casing to allow free weave of the axle and truck frame parts without disturbing the driving relationship and without damage to the drive or casing parts.

The entire motor and gearing casing can be freed from the axle for removal by removing the cap screws 63 and the split rubber bushings. Spacer rings 66, as of "Micarta," are pressed into the outer sleeve between the ends of the inner drive sleeve 54 and the rubber sleeves to keep the inner sleeve from shifting axially. The rubber bushings 60 are squeezed against curved shoulders 67 formed on the axle 15 to prevent end play between the axle and casing and at the same time to absorb shocks. When the rubber bushings are first inserted their ends engage the spacer rings 66 and their initial position is defined thereby but as they are compressed axially their ends are drawn away from the rings.

Holes 68 and 69 are provided through the outer and inner drive sleeves 47 and 54 for the passage of lubricant to prevent fretting corrosion.

While one embodiment of the invention has been disclosed in detail to illustrate the objects and advantages of the invention it is to be understood that there may be various embodiments and modifications within the general scope of the invention.

What is claimed is:

1. A shaft drive assembly, comprising in combination, an inner shaft, an outer sleeve surrounding said shaft, an intermediate driving sleeve between said outer sleeve and said shaft, said intermediate sleeve at one point along its length having an interior slip spline connection with the shaft and at a second point along its length, spaced axially from the first point, having an outer slip spline connection with the outer sleeve, and resilient elastic packing and sealing rings squeezed under pressure between said shaft and said outer sleeve outside the length of said intermediate sleeve.

2. A shaft drive assembly, comprising in combination, a shaft, an outer sleeve forming a casing about said shaft, means for rotating one of said outer sleeve and shaft, a drive sleeve arranged within the outer sleeve and splined to the outer sleeve and shaft for driving said shaft from said outer sleeve and allowing radial movement therebetween, and resilient elastic packing secured under pressure between the shaft and outer sleeve beyond the ends of the driving sleeve.

3. A shaft drive assembly as set forth in claim 2, wherein annular rings having inner curved surfaces are squeezed axially on said packing to force it inward against said shaft.

4. A shaft drive assembly as set forth in claim 2, wherein said shaft is provided with curved shoulders against which said packing is squeezed to hold the outer sleeve resiliently in a fixed axial position on said shaft.

References Cited in the file of this patent

UNITED STATES PATENTS

| | | |
|---|---|---|
| 993,570 | Webster | May 30, 1911 |
| 2,174,223 | Frauenthal et al. | Sept. 26, 1939 |
| 2,540,997 | Schmitter | Feb. 6, 1951 |
| 2,596,821 | Parkins | May 13, 1952 |
| 2,698,013 | Brill et al. | Dec. 28, 1954 |
| 2,778,565 | Atkinson | Jan. 22, 1957 |